March 19, 1957 J. M. HUNT ET AL 2,786,148

ELECTRONIC GROUND VOLTAGE NEUTRALIZING SYSTEM

Filed Jan. 7, 1955 2 Sheets-Sheet 1

ELECTRONIC GROUND VOLTAGE NEUTRALIZING SYSTEM

Filed Jan. 7, 1955 2 Sheets-Sheet 2

2,786,148

ELECTRONIC GROUND VOLTAGE NEUTRALIZING SYSTEM

John M. Hunt and Monson H. Hayes, Binghamton, N. Y., assignors to Link Aviation, Inc., Binghamton, N. Y., a corporation of New York Application January 7, 1955, Serial No. 480,452

9 Claims. (Cl. 307—95)

This invention relates to a method and means for neutralizing the effects of ground currents in electronic systems and apparatus, and more particularly to a method and means for maintaining a plurality of ground connections at a predetermined ground potential in electronic circuits.

The invention is particularly applicable to electronically controlled installations wherein a high signal-to-noise ratio is required to be maintained, as for example in large scale analog computing systems, instrumentation systems and communications systems. In such systems the complexity of the wiring can be reduced appreciably by the use of a common ground return system. The advantages of this system are such that a common ground system has been used in virtually all electronic equipment manufactured in recent years. In all common ground systems employing a large number of interconnected component sub-assemblies, a serious problem has been that of establishing and maintaining a ground bus conductor whose voltage, with respect to a predetermined ground reference point, remains at a constant and negligible value throughout the entire length of the ground bus conductor. The magnitude of this problem is generally proportional to the size of the apparatus installation, as the difficulty in maintaining a ground bus at a constant potential increases with the magnitude of ground return currents which must flow through the bus.

A common approach to this problem in the past has been to employ very large size conductors formed of a high conductivity material to provide a ground bus conductor offering as little electrical resistance as possible. Heavy copper conductors, having a relatively large cross-sectional area, have been generally employed for this purpose, and in some installations metallic silver conductors have been employed.

In most complex electronic systems, it is not possible to maintain one continuous ground bus conductor without junctions, because of the size, shape, and space limitations imposed upon the apparatus. Furthermore, the junctions which are usually provided in such bus conductors cannot often be permanently formed, because of the practical requirements for ease of assembly and disassembly. This gives rise to the problem of connecting two or more copper busses together with a minimum of contact resistances at each junction. Because of the inherent contact resistances present in each such junction, the ground bus conductors present in many electrical circuits may properly be considered as formed of several ideal ground busses connected together with lumped resistances at the junction points. The presence of these resistances in the path of the ground currents flowing through the bus result in voltage drops at the various junction points along the bus. The presence of these various voltages at different points of the bus produce what is generally known as "ground noise." In communications systems, the effect of such ground voltages may appear as conventional "noise" or cross-talk, while in electronic computing systems, such disturbances may result in computational errors.

In alternating current systems, even though the ground resistance is kept to a nominal value, by means of a bus bar having very large cross-sectional area, and by extreme care in making any necessary junctions, there may still be troublesome voltage drops caused by the ground currents flowing through the inductive reactance of such low resistance ground bus. This problem in A. C. systems increases proportionally as the frequency of the currents present, and may be quite appreciable in communications systems carrying signals of audio, video, or radio frequencies. The ground noise potentials present in such systems are often the result of combined A. C. voltages caused by the inductive reactance of the ground bus and D. C. voltages produced by the resistance of the bus conductor and its junctions.

In many complex electrical systems of the character to which the invention is applicable, a substantial portion of the total load current is required to operate motors, lights, relays, fans, heaters and other power consuming apparatus all of which produce large ground currents but none of which are appreciably affected by varying ground potentials. In such systems two separate and distinct ground busses may be provided and be joined at one and only one, common point which may be designated as the "reference ground" point. The bus conductor to which the power apparatus is connected is referred to as the "power ground" while the second bus is referred to as the "signal ground" conductor. In such a dual ground system the ground currents flowing through the power ground are generally of no effect or concern, but ground currents in the signal ground must be minimized or neutralized if the undesirable effects of ground noise are to be avoided. As it is generally necessary to connect a plurality of signal components or sub-assemblies to the signal ground conductor, it is desirable that each junction point on the signal ground conductor be maintained at the same constant potential, and preferably at the same potential as the reference ground point. The present invention achieves this desired result by a method of applying corrective potentials to each ground junction point, and by automatic means for adjusting the corrective potentials to values which neutralize the undesirable effects of varying ground currents.

Accordingly, it is an object of the invention to provide improved means for eliminating or neutralizing the effects of various ground potentials.

Another object of the invention is to provide an improved method of maintaining electrical conductors at any predetermined uniform potential throughout their length, regardless of currents flowing therethrough.

A further object of the invention is to provide means for eliminating ground noise voltages in any type of electronic apparatus without requiring the use of excessively large and costly ground bus conductors.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which corresponding parts are identified by like reference characters.

Figures 4, 5:
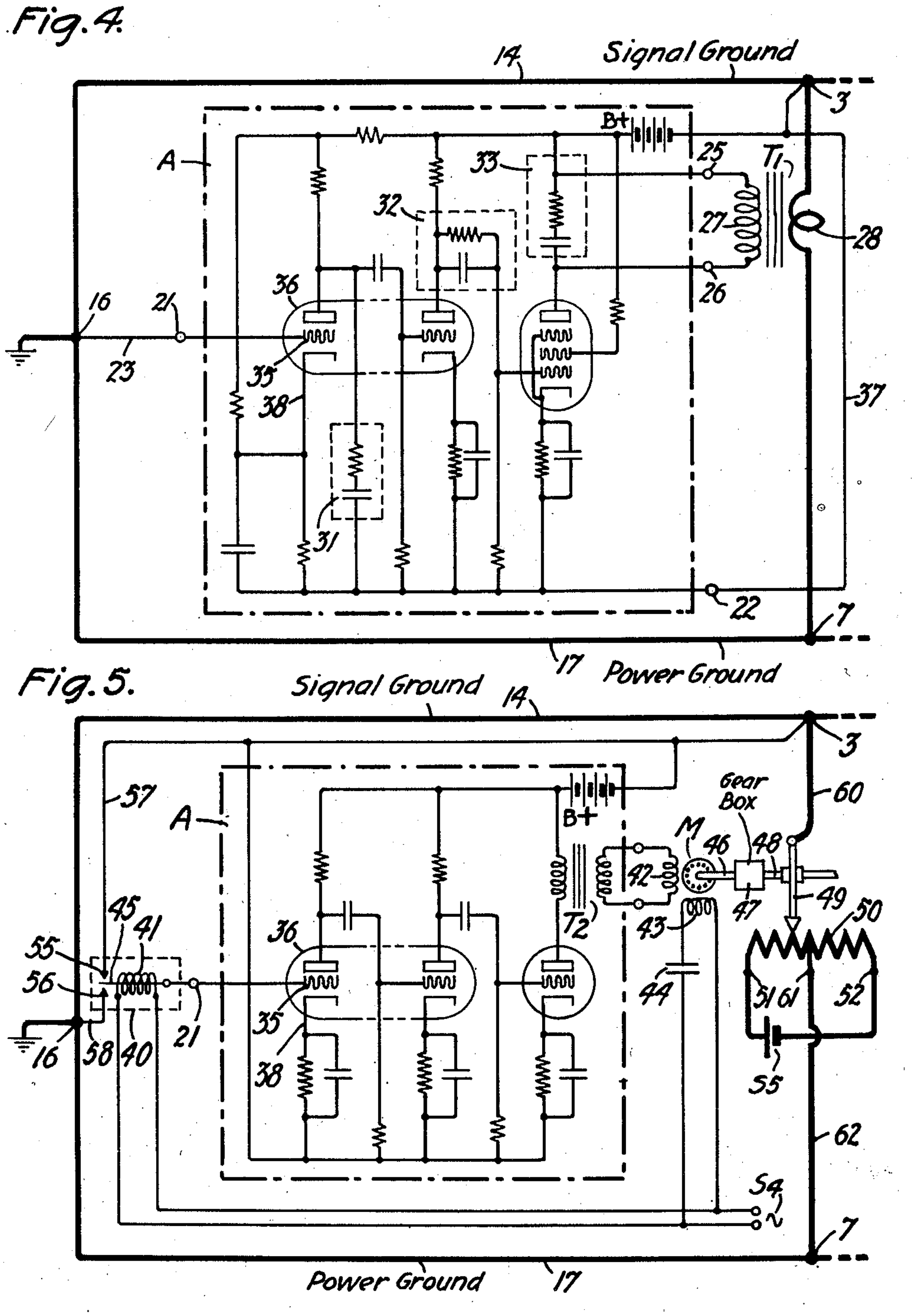

Fig. 4 represents a schematic diagram of the first embodiment, showing also the circuit details of one form of electronic amplifier suitable for use in the invention, and Fig. 5 represents a schematic diagram of another embodiment of the invention adapted to eliminate both A. C. and D. C. ground noise potentials.

Figure 1:
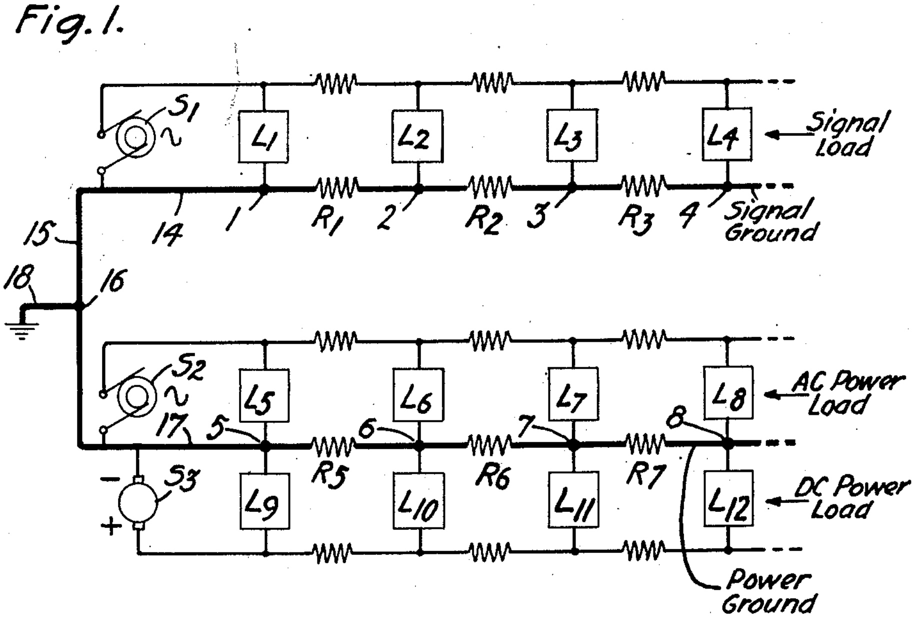
Fig. 1 represents a schematic diagram of a typical power distribution system employed in electronic apparatus, such as an analog computer.

Referring now in greater detail to the circuit of Fig. 1, which represents a typical power supply system for a large and complex analog computer, three primary sources of power are represented by the generators $S_1$, $S_2$, and $S_3$. $S_1$ and $S_2$ are represented as alternating current generators, while $S_3$ is represented as a direct current generator. $S_1$ supplies A. C. power to a plurality of signalling component loads $L_1$, $L_2$, $L_3$ and $L_4$, which may be electronic amplifiers or other sub-assemblies of the computer. One side of the generator $S_1$ and one side of each of the loads $L_1$ through $L_4$ is connected to a common signal ground bus 14, which is represented in Fig. 1 by a heavy line to indicate that this conductor is normally of large cross-sectional area. Thus, load $L_1$ is connected to signal ground 14 at junction point 1, $L_2$ is connected at junction 2, $L_3$ is connected at junction 3 and $L_4$ is connected at junction 4. Interposed between junctions 1 and 2 is a fixed resistance $R_1$ which represents the contact resistance of junction 1. $R_1$ also includes the resistance of that portion of the ground bus conductor 14, which extends between junction points 1 and 2, but because of the large cross-sectional area and high conductivity of the bus conductor, its internal resistance may be negligible as compared with the contact resistance at the junction point. Similar fixed resistances $R_2$ and $R_3$ are represented schematically between junction points 2 and 3, and 3 and 4 respectively, each of these resistances representing the contact resistance of the related junction points. The signal ground conductor 14 is connected by bus 15 to junction point 16 on a second ground bus conductor 17, which is identified as the power ground. The signal ground and power ground bus conductors 14, 15 and 17 are connected by a heavy conductor 18 to earth.

Connected across the output terminals of A. C. generator $S_2$ are a plurality of power loads represented by $L_5$, $L_6$, $L_7$ and $L_8$. These power loads may include fans, heaters, lights and other such apparatus not directly connected with the signal portion of the circuit. Across the terminals of the D. C. generator $S_3$ are connected a plurality of D. C. power loads $L_9$, $L_{10}$, $L_{11}$ and $L_{12}$ which may represent relays, solenoids, vacuum tube filaments or other elements of the circuit which require direct current power but which do not enter directly into the signal portion of the circuit. One side of each of the power loads, $L_5$ through $L_{12}$ is connected to the power ground bus 17 at the junction points 5, 6, 7 and 8 respectively. The fixed resistances $R_5$, $R_6$ and $R_7$ between junction points 5—6, 6—7, 7—8 represent the resistances of the respective junctions in the power ground bus.

As indicated by the broken line extensions of the power conductors in Fig. 1, it is to be understood that any number of additional loads may be connected to the respective power supply circuits. In a large and complex analog computer, or flight simulator, literally hundreds of different loads may be supplied by a distribution system as represented in Fig. 1. In such a system, it is theoretically desirable that each component or sub-assembly which must be connected to ground should be connected to an absolute or true ground which is at zero potential, or at least at a constant uniform potential, with respect to the other portions of the ground circuit.

As explained generally above, the flow of ground current from load 2 through resistance $R_1$ produces a voltage drop across $R_1$, which places junction point 2 at a higher potential than junction 1, thus defeating the ideal of a perfect ground for load $L_2$. The voltage drop across resistance $R_1$ will be further increased by the ground currents flowing from loads $L_3$, $L_4$ and whatever additional loads (not shown) may be connected to the signal ground circuit. Even though the resistance $R_1$ may be very low, the high value of total ground current which may flow through the signal ground bus 14 may produce a sufficient voltage drop across this resistance to appreciably disturb the potential values of load $L_2$ so as to introduce "noise" into the signal circuit, or to affect the accuracy of computations in a computing circuit. It will be readily apparent that junction points 3 and 4 of loads $L_3$ and $L_4$ will also be elevated above the potential of ground junction point 1 for the same reasons.

In the circuit of the power ground bus 17, the resistances $R_5$, $R_6$ and $R_7$ also raise the potential at ground junction points 6, 7 and 8 somewhat above the potential of junction 5 and the ideal ground point 16, but in this portion of the circuit, these ground voltages are generally of no concern as they do not appreciably affect the operation of the motors, heaters, relays and other heavy loads represented by $L_5$ through $L_{12}$.

Figure 2:
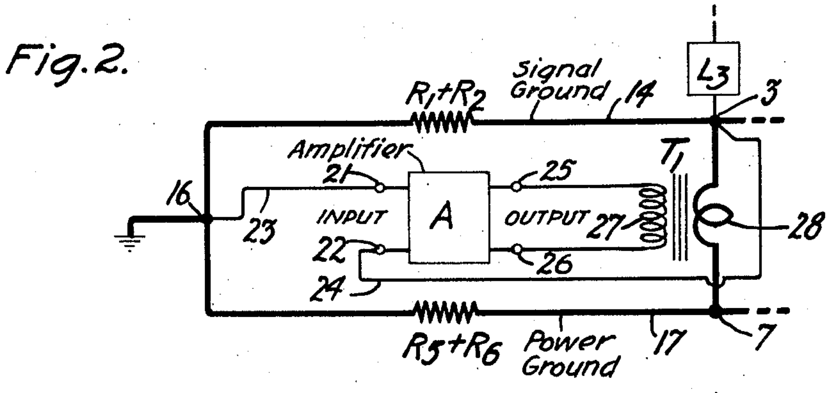
Fig. 2 represents a schematic diagram of one embodiment of the invention in a double ground A. C. power system.

The problem which the invention solves is that of maintaining signal ground junction points such as 1, 2, 3 and 4 in Fig. 1 at a constant ground potential which may be referred to as an ideal or true ground potential. The manner in which this is accomplished is illustrated by the simple schematic drawing of Fig. 2 which will now be described in detail. Let it be assumed that in the circuit represented by Fig. 1, deviations in the ground potential at junction 2 of $L_2$ are of no particular concern, but that in this circuit, which may be for example a precise computer, any deviation in ground potential at junction 3 for load 3 must be prevented in order to assure the required accuracy of system operation. Thus in the simplified schematic of Fig. 2, the total ground resistance between load $L_3$ and the ideal ground point 16 is lumped together schematically as $R_1$ and $R_2$ in series with the signal ground conductor 14. The total voltage drop due to signal ground currents flowing through $R_1$ and $R_2$ must be corrected for, or neutralized, if junction 3 is to be maintained at the same potential as the ideal ground point junction 16. This may be accomplished as shown in Fig. 2, by means of a high gain amplifier, indicated generally as A, having input terminals 21 and 22 which are connected respectively by conductors 23 and 24 to the ground junction points 16 and 3. The output terminals 25 and 26 of amplifier A are connected to the high impedance primary winding 27 of output transformer $T_1$. The low impedance secondary winding 28 of transformer $T_1$ is connected between ground bus junctions 3 and 7.

The basic operation of the circuit of Fig. 2 is to compare continuously the potential at junction 3 with the ideal ground potentional at junction 16, to detect any slight difference in these potentials and instantaneously to amplify this difference signal to produce a correcting signal of sufficient magnitude to force the potential at the critical junction point 3 to become equal to the potential at the ideal ground point 16.

In order to understand how this is accomplished by the circuit of Fig. 2, let us first assume that junction points 7 and 16 are at the same instantaneous potential. It is to be understood that this is not a requirement of the system, but an initial understanding of the operation of the circuit is facilitated by this assumption. Now, if the potential at junction point 3 were to increase positively with respect to the potential at point 16, an input signal to amplifier A would drive the cathode of the amplifier input stage (shown in detail in Fig. 4)

positive with respect to its grid. Then if the output transformer $T_1$ is phased as indicated, the amplifier output signal across winding 28 of $T_1$ will drive junction point 3 negatively with respect to point 7. Thus it will be seen that the output signal from amplifier A will drive junction point 3 in the opposite electrical direction (polarity) from which point 3 tends to drift because of ground currents flowing through $R_1$ and $R_2$. In effect then, what the amplifier A appears to do is to produce output currents which cancel the normal ground currents, thereby eliminating any possibility of variations in ground potential. For this reason, the output transformer $T_1$ must produce at least as much current as is normally flowing in the ground system. Although these currents may at times be appreciable, the voltage drops which they produce through the very low resistance of the heavy ground bus conductors are extremely small so that the total power requirements of the amplifier A are also small.

In the above analysis of Fig. 2, it was assumed that the potential of point 7 was at the same potential as point 16. Let us now reverse this assumed condition and assume that junction point 3 is at the same instantaneous potential as point 16, and that the potential at junction point 7 increases in a positive direction with respect to point 16. Because of the direct coupling from junction point 7 to junction point 3 through the low impedance secondary winding 28 of transformer $T_1$, as the potential at point 7 increases positively so also will the potential of point 3. Then, in the same manner as described above, a signal will be fed into the amplifier A which will produce in the secondary 28 of the output transformer $T_1$ a signal which will drive the potential of point 3 negative with respective to point 7, thus neutralizing or canceling the potential at point 7. To do this, the transformer $T_1$ must be capable of supplying a voltage greater than any voltage difference which might exist between junction points 7 and 3. However, this voltage difference, as pointed out above, is normally very small even without the corrective system of the invention.

In an actual installation of a large and complex analog computer system as embodied in a flight simulator, it has been found that an output transformer having a step-down ratio of 600 to 1 may be employed as $T_1$ in connection with a high gain feedback amplifier A which in response to a very small input potential will produce an output potential of 120 volts at 0.03 ampere. With these values of components, a current of 18 amperes at 0.2 volt is induced into the secondary winding 28 of transformer $T_1$. It will be understood, of course, that different values of output current and voltage may be required for each particular system installation and that other components having appropriate values may be employed as necessary.

Figure 3:
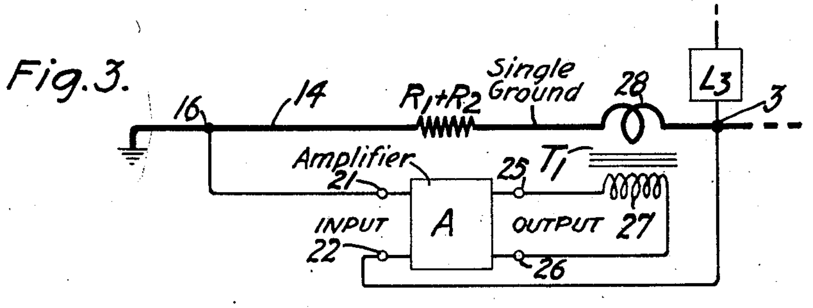
Fig. 3 represents a schematic diagram of an alternative embodiment wherein the invention is applied to a single ground A. C. power system.

The invention may be employed in power systems having only a single ground bus as illustrated schematically by Fig. 3 of the drawings. It will be understood that power supply systems employing but one ground bus conductor may include one or more primary sources of power, but that all load circuits are connected in such systems to the same common ground bus conductor. In the alternative embodiment of Fig. 3, the secondary winding 28 of output transformer $T_1$ is connected in series with the ground bus conductor 14, between junction points 3 and 16. The resistance of the ground conductor path is schematically represented as $R_1$ plus $R_2$, to correspond to the similar notation in Fig. 1 and Fig. 2.

The operation of the circuit of Fig. 3 is essentially the same as that of Fig. 2, the potential difference between the ideal ground point 16 and the ground junction point 3 being applied to the input terminals 21 and 22 of high gain amplifier A, while the output terminals 25 and 26 of A are connected to the high impedance primary winding 27 of output transformer $T_1$. Any slight incremental change in potential between points 3 and 16 is amplified by A and produces across the output winding 28 of transformer $T_1$ an equal potential of opposite polarity to drive the potential at junction 3 in the opposite direction from which it may otherwise tend to drift, thereby maintaining the potentials at points 3 and 16 equal at all times. In the circuit of Fig. 3, the wattage requirements of the amplifier A are less than the power requirements of the corresponding amplifier in Fig. 2, since only the incremental changes in ground bus potential need be reproduced in the circuit of Fig. 3, whereas the amplifier circuit of Fig. 2 is required to produce the relatively higher voltages of the power bus. The theory of operation of the circuit of Fig. 3 is identical with that previously described above in reference to Fig. 2 of the drawings.

Referring now to Fig. 4 of the drawings, the fundamental circuit of Fig. 2 is here expanded to disclose in detail the circuit of a high gain feedback amplifier which has been found suitable for use in the invention. This is a conventional A. C. amplifier of the type employed generally in computer apparatus. The amplifier shown schematically in Fig. 4 differs from conventional A. C. amplifiers in only two respects, namely, the turns ratio of the transformer $T_1$ 600 to 1 step-down from primary to secondary, to produce a very low output voltage at a relatively high current, as described above. The amplifier of Fig. 4 also contains frequency corrective networks, as represented by the combinations of resistance capacitance networks 31, 32 and 33, which have been introduced into the amplifier circuitry for the purpose of establishing an overall amplifier frequency response of sufficient range to assure stable amplifier operation when large amounts of energy are fed back from the output circuit directly into the input grid. It is important that the amplifier be designed to operate stably with large amounts of feedback, as the specific application of the amplifier in the ground voltage eliminator circuits of the invention necessitates the feedback of amplifier output to the input terminals. The amplifier of Fig. 4 is grounded by connection of the cathode return line, terminal 22 to the signal ground junction point 3 by conductor 37. By this means, the cathode 38 of the amplifier input stage 36 is established at signal ground potential.

To those familiar with feedback amplifier theory as taught by Black, Nyquist, Bode and Swartzel, it will be readily apparent that the system of the invention will reduce the noise voltage present at the sampling point (i. e. at ground junction point 3) by a factor equal to the loop-gain of the feedback amplifier at the particular frequency of operation. This is evident from the fact that there must be sufficient signal at the sampling point (junction 3) to drive the amplifier A so that its output closely approximates the level of the noise signal present without feedback.

Reference is now had to Fig. 5 of the drawings which discloses an embodiment of the invention which may be employed to eliminate D. C. components of ground voltage in direct current computer circuits. The amplifier circuit disclosed in Fig. 5 corresponds to amplifier A of Fig. 2 and Fig. 3 and may be identical with the amplifier disclosed in detail in Fig. 4. The input signal in this circuit, however, is fed to the grid 35 of the first amplifier stage 36 through contacts of an intermittent motor driven chopper 40, which may be an electromagnetically operated vibrator of a type well known in the art. The driving coil 41 of vibrator 40 is shown in Fig. 4 connected to a source of alternating current $S_4$, which may be a commercial A. C. power line. It is to be understood, however, that a D. C. power vibrator may be employed if preferred. The output transformer $T_2$ of the amplifier circuit in Fig. 4 is connected to one winding 42 of a two-phase servomotor M while the fixed phase winding 43 of motor M is excited from the same source $S_4$ which drives vibrator 40. By means of a phase shift capacitor 44, the fixed phase winding 43 of motor M is excited by voltage having the same frequency, but 90° out of phase with the mechanical motion of the vibrator reed 45.

It is assumed in the circuit of Fig. 4 that the phase shift between the input stage 36 and the output transformer $T_2$ of the servo amplifier is zero. Corrective circuits may be introduced in a well-known manner to adjust the overall phase shift of the system to correct for any possible difference between the phase shift of the amplifier and the phase shift between vibrator motion and vibrator excitation voltage, if desired.

The output shaft 46 of servomotor M is coupled through a gear reduction train 47 to connecting means 48 for imparting motion to the slider arm 49 of power potentiometer 50. Connected across the outer terminals 51 and 52 of power potentiometer 50 is a source of direct current $S_5$ capable of delivering a low voltage at a relatively high current. The source $S_5$ may be a battery as represented schematically in Fig. 5 or may be any other suitable source of high current low voltage D. C., as for example a rectified D. C. power supply.

The operation of the circuit of Fig. 5 is similar in principle to the operation of the A. C. circuits previously described in reference to Fig. 2, Fig. 3 and Fig. 4 of the drawings. It will be observed that as contact 55 of vibrator 40 is connected by conductor 57 to the signal ground junction point 3, while the opposite contact 56 of vibrator 40 is connected by conductor 58 to the true ground reference point 16, the vibratory reed 45, which alternately engages contacts 55 and 56 in response to energization of coil 41, will connect the grid 35 of the input stage 36 alternately to junction points 3 and 16, thus applying an error signal to the input of the servo amplifier which is the difference between the actual signal ground voltage at junction point 3 and the ideal reference ground voltage at point 16. The difference between the voltage at these two points is converted by means of the chopper 40 into an A. C. square wave having a peak-to-peak magnitude equal to the D. C. voltage error. This low voltage square wave is amplified by amplifier A as an A. C. signal, without D. C. drift error, and after amplification is impressed upon the control winding 42 to operate servo motor M. Thus operation of the motor M drives the potentiometer slider 49 to a position such that the D. C. voltage from source $S_5$ which is applied to junction point 3 through conductor 60 is of opposite polarity but equal magnitude to the error voltage detected at point 3. It will be noted that as a permanent center tap 61 of potentiometer 50 is connected by conductor 62 to the power ground at point 7, movement of the potentiometer slider 49 to either side of the center tap 61 will apply either positive or negative potential to junction point 3, as may be required.

The circuit of Fig. 5 can be employed to eliminate the D. C. and low frequency components of ground voltage, but this circuit is incapable of eliminating alternating components of ground voltage with frequencies greater than the response speed of the servo system. The servo-driven D. C. ground voltage eliminator of Fig. 5 may be employed on the same ground bus to which the A. C. ground voltage neutralizers of Fig. 2, Fig. 3 or Fig. 4 have been attached, thus providing complete elimination of ground voltage variations from zero frequency up to very high frequencies.

It is to be understood to be within the scope of the invention that D. C. ground noise voltages may also be neutralized by means other than the specific embodiment of Fig. 5. For example, a multi-contact motor driven switch may be employed in lieu of the single reed vibrator 40 in Fig. 5, and the output of amplifier A may be directly connected through a suitable step-down transformer and a pair of alternately closed switch contacts, to apply corrective potentials alternately between junction points 3 and 7. Such alternative arrangement eliminates the need for servomotor M, connecting drive shafts and gear box 46, 47, and 48, and also eliminates the requirement for high current potentiometer 50 and direct current source 55. It will also be understood that a servometer driving a D. C. potentiometer, as disclosed in Fig. 5, may be employed in lieu of the output transformer circuits of Fig. 2, Fig. 3 and Fig. 4, if desired.

It is to be further understood that although the detailed description above has been directed to neutralizing or equalizing ground potentials between two selected points, a ground signal junction point and the reference, or true ground point, a plurality of ground potential eliminators as shown herein may be employed for the purpose of eliminating unwanted ground potentials at as many points as may be required throughout a large or complex electronic system installation. Because the ground voltages to be eliminated are usually quite small, the power requirements of the ground voltage eliminator circuits are also small so that relatively inexpensive amplifiers may be employed. In addition to eliminating troublesome ground voltage variations, the method and means of the invention disclosed herein permit the design and construction of large electronic systems in which ground bus conductors of a much smaller size may be employed than has heretofore been possible, thereby saving copper or more costly metal conductors and reducing the problem of installing the large ground bus structures which have heretofore been required.

Although the invention has been described as particularly applied to electronic apparatus such as analog computers or flight simulators, it is to be understood that the invention is equally applicable to other electronic systems, as for example radio or television studios and transmitting stations, X-ray installations, or any other electrical system installations where large ground return currents are a problem.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Electronic apparatus for neutralizing internal currents in a common conductor to which a plurality of external circuits may be connected, comprising potential amplifying means having a high impedance input circuit and a low impedance output circuit, means connecting said input circuit to a pair of points on a common conductor to be neutralized and means connecting said low impedance output circuit between the pair of said conductor points whereby any potential difference between said points on said conductor is thereby minimized to neutralize said internal current.

2. Means for eliminating internal currents in a conductor common to a plurality of external circuits comprising a high gain potential amplifier, high impedance input means in said amplifier, means connecting said amplifier input between a reference point and a second point on said common conductor to be neutralized, low impedance output means in said amplifier for converting amplified potentials thereof to lower potentials at higher currents, and means connecting said low impedance output means between said second point and another selected point on said common conductor whereby any potential difference between said reference point and said other selected point applied to said amplifier input is converted to a corresponding potential of opposite polarity and applied to said selected point to substantially maintain said reference point and said other selected point at constant and equal potentials.

3. In electrical apparatus including a plurality of external circuits connected to a common return conductor, means for eliminating internal currents through said conductor comprising, potential amplifying means having a high impedance input circuit and a low impedance output circuit, means connecting said input circuit between a reference point and a selected junction point of an external circuit on said common conductor, and means connecting said low impedance output circuit to said conductor at said selected junction point, said amplifying means and said low impedance output circuit cooperating to convert any potential difference between said reference point and said junction point caused by current flow through said conductor to a current of substantially equal magnitude but opposite polarity to oppose said current and maintain said junction point at substantially the same potential as said reference point.

4. In electronic apparatus including a common conductor bus, means for maintaining said conductor at a uniformly low potential with respect to a preselected reference point on said conductor, comprising potential amplifying means having a high impedance input circuit connected between said reference point and any other selected point on said ground conductor, low impedance output means connected with an output circuit of said amplifying means for converting amplified potentials thereof into lower potentials at relatively higher currents, and means connecting said low impedance output means to said other selected point on said conductor whereby any change in input potential to said amplifying means resulting from currents flowing through said conductor produces a current of substantially equal magnitude in said low impedance output circuit and of opposite polarity to said conductor current to maintain a constant potential at said other selected point.

5. In electronic apparatus including an electrical conductor common to a plurality of circuits, the method of maintaining any first selected point on said conductor at a uniformly constant potential with respect to any second selected reference point, which comprises the steps of detecting any potential difference between said first and second points, amplifying said detected potential difference, converting said amplified potential to a relatively high current at a lower potential corresponding in magnitude to the amplitude of said detected potential difference, and applying said converted low potential high current between said first and second points in a sense opposing said initially detected potential difference.

6. The method of automatically maintaining a plurality of points on a common electrical conductor at a constant potential, comprising the steps of detecting any incipient potential difference between first and second selected points, amplifying the detected potential, converting the amplified potential to a lower amplitude higher current signal, and applying said converted signal in opposition to said initially detected potential to eliminate any potential difference between said first and second selected points.

7. In electrical apparatus having an electrical conductor common to a plurality of circuits, means for constantly maintaining a plurality of circuit junction points on said conductor at equal potential regardless of changes in current flow therethrough, comprising high impedance potential detecting means connected to at least two selected points on said conductor, potential amplifying means coupled with said potential detecting means, low impedance output means coupled to the output of said amplifying means for converting the amplified output potential thereof to a lower potential at a higher current, and low impedance means connecting said output means between said selected junction points on said conductor.

8. In electrical apparatus having an electrical conductor common to a plurality of circuits, means for constantly maintaining a plurality of circuit junction points on said conductor at equal potential regardless of changes in current flow therethrough, comprising a high gain negative feedback amplifier having a high impedance input circuit and a low impedance output circuit, means connecting said input circuit between a first pair of selected junction points on said conductor, and low impedance means connecting said output circuit between one junction point of said first pair and a second junction point on said conductor.

9. In electrical apparatus having an electrical conductor common to a plurality of circuits, means for constantly maintaining a plurality of circuit junction points on said conductor at equal potential regardless of changes in current flow therethrough, comprising a high gain alternating current amplifier having a feedback loop connection from the output to the input circuits thereof, means including a high speed circuit interrupter for alternately connecting the input of said amplifier to either of two selected junction points on said conductor, servomotor means connected with the output of said amplifier and operable thereby, a variable potential divider having a movable tap thereon connected with said motor and adapted to be operated thereby, a source of high current low voltage direct current connected across said potential divider, a fixed center-tap on said potential divider connected through a low impedance path to one junction point on said conductor, and low impedance means connecting the movable tap of said potential divider to the other of said junction points on said conductor.

References Cited in the file of this patent

UNITED STATES PATENTS 1,191,611 Potter ---------------- July 18, 1916